March 30, 1948.  E. R. KNOWLES  2,438,857
INJECTION UNIT FOR PLASTICS MOLDING
Filed Feb. 24, 1944  2 Sheets-Sheet 1
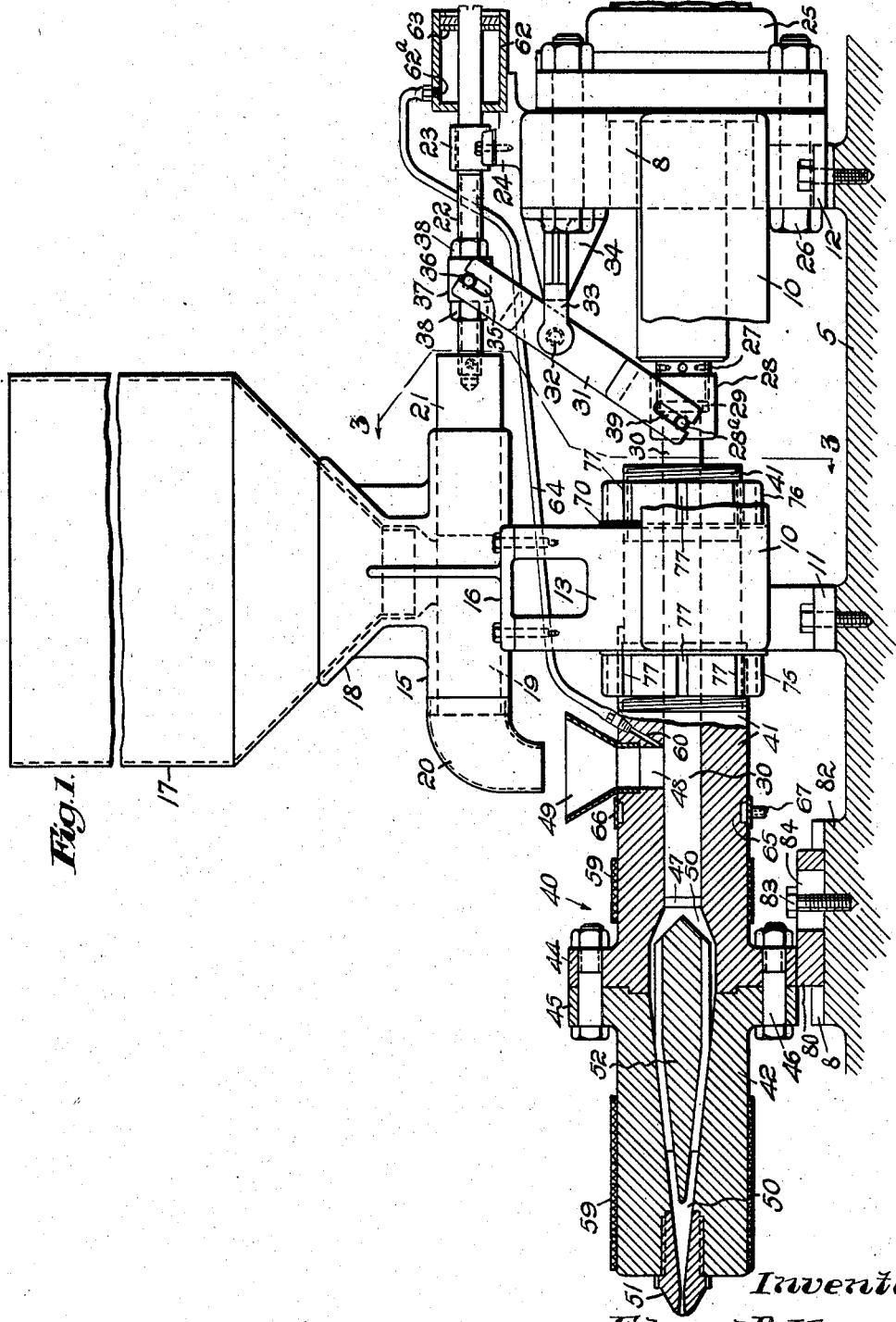
Inventor.
Edward R. Knowles
by Emery, Booth, Townsend, Miller & Weidner
Attys March 30, 1948.  E. R. KNOWLES  2,438,857
INJECTION UNIT FOR PLASTICS MOLDING
Filed Feb. 24, 1944  2 Sheets-Sheet 2
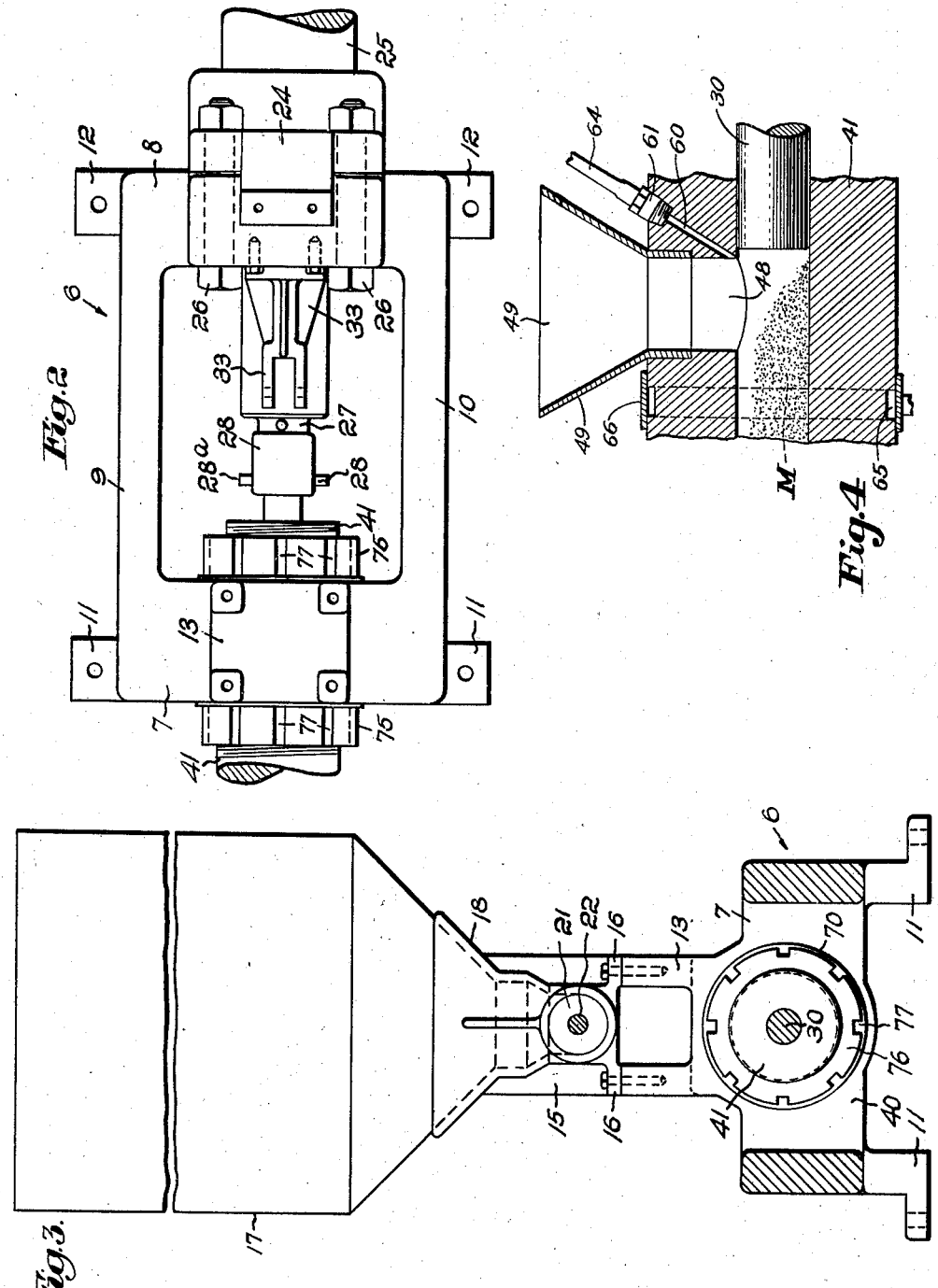
Inventor:
Edward R. Knowles
by Emery, Booth, Townsend, Miller & Weidner
Attys Patented Mar. 30, 1948

2,438,857

UNITED STATES PATENT OFFICE 2,438,857

INJECTION UNIT FOR PLASTICS MOLDING

Edward R. Knowles, Nashua, N. H.

Application February 24, 1944, Serial No. 523,678

5 Claims. (Cl. 18—30)

1

My present invention relates to plastics molding apparatus, having reference to the various synthetic resins and other moldable materials and compositions as generally comprehended under the term "plastics," whether thermoplastic or thermosetting. More particularly it aims to provide a simplified and otherwise improved means for delivering molding material in the desired condition for reduction to product form, such means being so constructed and arranged that it may readily be accommodated to various different use conditions, as to type of materials, size of dies, temperature and pressure requirements, and other factors.

In the drawings illustrating by way of example one embodiment of the invention:

Fig. 1 is a side elevation, with parts in longitudinal section, showing the injection or delivering apparatus or unit as a whole;

Fig. 2 is a top plan of a central portion of the apparatus of Fig. 1, with elements of the feed means removed to expose underlying parts;

Fig. 3 is a vertical cross-section as on the line 3—3 of Fig. 1; and

Fig. 4 is a longitudinal section at the material-receiving portion of the cylinder, on a somewhat larger scale than in Fig. 1, with the charging plunger retracted.

Referring to the drawings in more detail, the injection apparatus or unit as a whole is adapted for separable mounting on a base or other support as represented at 5. It comprises a main supporting body or platform-like frame indicated generally at 6, Figs. 2 and 3, and herein illustrated as an integral casting including a front cross member 7, a rear cross piece 8, and connecting side bars 9, 10. This frame as illustrated is centrally open and is provided with front and rear pairs of supporting feet 11, 12 received on and secured to the base 5 as by bolts or screws.

The front cross portion 7 of the frame has formed centrally on it a pedestal element 13, shown as an open or double yoke-like formation, on which the supply means for the molding material is mounted. Such means herein comprises a receiver 15 with flanges 16 seated on and demountably secured to the frame pedestal 13. The molding material, generally in granular or powder form is loaded into a hopper 17 removably held in a flaring seat 18 on the receiver 15 and opening downwardly into a measuring and feeding compartment 19 in the latter. A down spout 20 leading from the feed compartment directs the material to the conditioning and ejecting means to be described.

2

The molding material is intermittently metered out at the spout 20 as by means of a plunger 21 guided in the receiver 15 for alternate forward feeding and return movement. An actuating rod 22 is detachably connected to the rear end of the feed plunger and has bearing support in a sleeve 23 detachably fixed on a vertical boss 24 centrally disposed on the rear frame member 8.

The described feed mechanism and the other moving parts to be referred to desirably have a common drive means, herein illustrated as an hydraulic or fluid-pressure cylinder 25 demountably secured to the rear frame member 8 as by the anchor bolts 26, the frame being suitably apertured for passage of the fluid-actuated piston 27. The latter is threaded at its front end to receive the internally threaded coupler 28 applied over the flanged rear end 29 of the charging plunger 30 of the heating cylinder or conditioning unit to be described.

The feed rod 22 and the charging plunger 30 are interconnected for actuation oppositely, the one being advanced as the other is retracted. Herein for the purpose I have illustrated a two-arm lever 31 pivoted as at 32 in a bearing fork 33 on a bracket 34, Figs. 2 and 3, demountably secured to the rear frame member 8. This lever 31 is forked at its ends, to straddle the feed rod 22 and the charging plunger 30 respectively. Its upper forked end has open bearing slots 35 engaging lateral pins 36 on a sleeve 37 movably received on the rod 22 between stops 38 adjustably threaded thereon. By shifting the latter on the rod various extents of lost motion may be provided between it and the lever 31, thereby proportionately to regulate the stroke of the rod and the quantity of molding material to be delivered from the spout 20 for each operating cycle. The lower end of the lever 31 has similar pivotal and sliding connection as at 39 with the pressure piston 27 and hence with the charging plunger 30 as through bearing pins 28a on the threader coupler 28.

The apparatus as a whole further comprises a charging, conditioning and discharging means or unit for the molding material, as seen at the lower left portion of Fig. 1, and in Fig. 4. This unit as a whole will herein be referred to generally as the heating cylinder, or the injecting or delivery cylinder or unit. Heretofore so far as I am aware any generally corresponding heating and discharging means has been built into injection apparatus in such manner as to make little or no provision for selective positioning of the discharge point relative to a receiving mold, or for controlling the quantity or "shot" of the conditioned molding material by regulation of the cylinder position with respect to the actuating means and the apparatus as a whole.

For use with dies of various different shapes, sizes and cavity capacity it accordingly has heretofore been necessary to make various compensating adjustments in the die-holding means or press and frequently also to alter the position of the entire injection apparatus relative to the mold orifice or gate.

As an important feature of the present invention the heating or injection cylinder proper, now to be described, is constructed and arranged as a demountable unit, indicated generally at 40, having capacity for longitudinal adjustment relative to the apparatus as a whole and with respect to the charging means, the supporting base and other elements.

This material-receiving, conditioning and discharging unit or cylinder 40 herein comprises a body 41 and a separable front section or head 42 generally conforming to the body, as a longitudinal extension thereof. The abutted ends of these cylinder parts 41, 42 are interfitted accurately to align them and to provide a sealed joint. They are secured together detachably as by means of mutually abutting lateral flanges 44, 45, receiving connecting bolts 46.

The cylinder body 41 has a continuous axial bore 47 slidably receiving the charging plunger 30, previously mentioned. A lateral port 48 in the cylinder wall opens into the bore 47 and is externally fitted with a funnel 49 in line with the feed spout 20, to receive successive quantities of the molding material from it.

In axial line with the cylinder bore 47 is an elongated heating or conditioning chamber 50 herein formed partly in the cylinder body 41 and partly in the head 42. It includes a mouth flaring forwardly from the cylinder bore and admitting to a generally cylindrical portion. Thence forwardly the chamber 50 tapers uniformly to its discharge end at a nozzle 51 threaded into a central recess at the front end of the cylinder head 42. This forward tapered section of the chamber is of substantial length, herein occupying a major extent of the cylinder head, the chamber wall accordingly defining an elongated conical surface concentric with the cylinder axis. A torpedo or spreader 52 is secured within this conical chamber to ensure uniform heating of plastic material passing through the chamber.

The cylinder 40 is equipped with heating means, as for example one or more electrical inductive coils 59, 59 on either or both of the cylinder sections 41, 42, positioned and controlled to subject the cylinder walls and the conditioning chamber and spreader means enclosed by them to the desired degree of maintained heat.

In Fig. 1 the charging plunger 30 is shown advanced, the feeding piston 21 accordingly being retracted. At such time, in the normal operation of the apparatus, a single shot or charge of the plasticized material will have just been ejected at the nozzle 51, and the forward end of the cylindrical bore 47 and the conditioning chamber 50 have at the same time been replenished by a further mass of the material brought forward ahead of the advancing plunger 30. This material content, including such fresh supply and any previously supplied balance in excess of a single shot is held and conditioned in the chamber in readiness for the next injection shot.

In continued operation the charging plunger 30 is withdrawn, sufficiently to carry its front end to a position behind the charging port 48. When said port is thus uncovered by the retracting plunger, additional material from the funnel 49, supplemented by a further supply from the nozzle 20 under the influence of the forwardly moving feed piston 21, flows or drops down into the bore 47 ahead of the plunger; see Fig. 4. Thus a measured quantity of the material is presented via the charging port 48.

To assist the forward movement of the incoming material and to insure a full supply ahead of the charging plunger 30, supplemental means desirably is provided for directing the material or some portion of it forwardly beyond the entry port 48, and to keep it from objectionably accumulating opposite the port, with a tendency to block adequate feed-in from the funnel 49 or to be merely forced back up into the port. For this purpose I have provided pneumatic means such as seen in Figs. 1 and 4. Such means herein comprises one or more forwardly opening ducts 60 extended inwardly through the cylinder wall and into the bore 47 at or rearwardly of the rear peripheral edge of the entry port 48.

Compressed air or other fluid under pressure is admitted to such ducts, each having at the outer end a nipple 61 for attachment of an air supply line or the like. While such gaseous pressure medium may be otherwise supplied, preferably the relatively small volumes required for the purpose are obtained through the action of a moving part of the injector unit itself, as for example the feed piston 21 or its actuator rod 22. To that end I have herein illustrated a dashpot, air-compression cup or pump 62, see particularly Fig. 1, mounted on the boss 24 which supports the bearing sleeve 23 for the actuating rod 22. A flange-like piston member 63 is adjustably fixed on said actuating rod, in position to enter and compress air in the cup 62 during advance of the rod 22. A flexible hose or other piping connection 64 leads from a port 62a at a forward portion of the cup 62 to the attaching nipple 61 at the blow-duct 60. Said port 62a and the piping connection are of relatively small diameter, as compared for example with the material feed port 48, to deliver to the cylinder bore the adequate gentle flow or leak of air, as contrasted with a disruptive blast, for forcing the material as deposited from the port 48 forwardly beyond the latter, for the purposes as previously stated. While the air for thus distributing the material may be taken from some other supply line or outside source, under control of a valve timed with the feed plunger 21, the means as here disclosed has the further advantage of presenting dry air, free of moisture of condensation as likely to occur in an air hose from some central supply. A quantity of material thus distributed is diagrammatically indicated at M, Fig. 4.

With various materials which become plastic at a relatively low temperature, or if desired in any case, the temperature conditions in the cylinder adjacent the material entry port 48, may be further controlled as by the provision of suitable cooling means. For this purpose I have in Figs. 1 and 4 represented the rear section 41 of the cylinder as formed with a jacket 65, herein comprising a recessed portion in the cylinder wall closed by a sleeve or the like 66. Water or other coolant is circulated through the jacket 65 via inlet and outlet connections, one of which is seen at 67, Fig. 1, these being connected with any convenient supply of the coolant.

The entire conditioning unit or cylinder 40 is adjustably secured for longitudinal movement relative to the main frame 6. For this purpose, the front cross member 7 of the frame is bored to receive the cylinder 40 and provide a bearing therefor, as at 70 (see Fig. 3), and portions of the cylinder on each side of its bearing area are threaded to receive the jam nuts 75 and 76, thus enabling slight adjustments of position to be made by loosening one or the other of the nuts, as by application of a spanner wrench to the notches 77, and retightening the nuts in the desired location. It will be understood that the threaded portions of cylinder 41 may be of different diameters, to enable easy assembly of the cylinder in its bearing 70, preferably the portion engaged by nut 76 being of such diameter as to slide easily through the bearing portion 70.

For further support of the cylinder element as a whole, more particularly at its forward portion, and to hold the same in given angular position and against turning during adjustment or at other times, further supporting means desirably is provided. As represented in Fig. 1 such means herein comprises a supporting foot or plate 80 integrally or otherwise fixed at the base of the flange member 43 of the rear section 41. This foot 80 is slidably received in a guideway 81 formed in and extending longitudinally of a boss or block 82 on the base 5, the side edges of the foot desirably being bevelled and the side walls of the guide slot 81 undercut to afford them a dovetailed relation. Clamping or locking means may be provided for anchoring the foot 80 at the location selected for the cylinder 40, such as the bolt 83 extending through a slot 84 in the foot 80 and tapped into the block 82.

My invention is not limited to the particular embodiment thereof as herein illustrated or described by way of example, and I set forth its scope in my following claims.

I claim:

1. In a charging apparatus for plastics molding, a supporting frame, a material conditioning and discharging element associated therewith and having a conditioning chamber, a longitudinal bore leading to the chamber and a charging plunger reciprocable in the bore, between advanced and retracted positions, a feed port communicating laterally with the bore ahead of the retracted plunger position, means for intermittently depositing quantities of molding material through said feed port and into the adjacent bore portion, and other means independent of said material depositing means for distributing the in-fed material forwardly along the bore in advance of the plunger, and means for causing simultaneous operation of said depositing means and said distributing means.

2. Charging apparatus according to claim 1 wherein the material distributing means is pneumatic.

3. In charging apparatus for plastics molding, a cylinder presenting a conditioning chamber from which plasticized material is to be discharged, a feed passage in the cylinder leading to said chamber, a feed port in the cylinder for laterally entering material to said passage, plunger means reciprocable in the feed passage between forward and rear positions respectively ahead of and behind the feed port to advance material fed thereto, other reciprocable means for intermittently feeding material through the port to the feed passage, a duct in the cylinder for fluid under pressure admitting to the feed passage at the rear of the feed port, and means coordinated with the plunger means for delivering fluid under pressure through said duct thereby to distribute in-fed material along the feed passage ahead of the plunger means.

4. Charging apparatus according to claim 3, wherein the fluid delivering means comprises a pump device operatively associated with one of the reciprocable means and communicating with the admitting duct.

5. Charging apparatus according to claim 3 wherein the fluid delivering means comprises relatively movable cup and piston elements adapted to compress air between them, a piping connection between the cup element and said duct adapted to bleed air to the latter as compressed, and means for actuating said elements in timed relation to the material feeding and advancing means.

EDWARD R. KNOWLES.

REFERENCES CITED

The following references are of record in the file of this patent:

UNITED STATES PATENTS

| Number | Name | Date |
| --- | --- | --- |
| 452,599 | Dooley | May 19, 1891 |
| 1,810,126 | Buchholz | June 16, 1931 |
| 2,057,945 | Gastrow | Oct. 20, 1936 |
| 2,226,448 | Smith | Dec. 24, 1940 |
| 2,233,558 | Shaw | Mar. 4, 1941 |
| 2,243,968 | Lester | June 3, 1941 |
| 2,262,615 | Lester | Nov. 11, 1941 |
| 2,304,461 | Knowles | Dec. 8, 1942 |
| 2,334,372 | Abbott et al. | Nov. 16, 1943 |
| 2,353,276 | Stewart | July 11, 1944 |